United States Patent
Bank et al.

(10) Patent No.: US 9,419,501 B1
(45) Date of Patent: Aug. 16, 2016

(54) CONSTANT FORCE SHAFT GROUNDING BRUSH HOLDER

(71) Applicant: Phoenix Electric Mfg. Co., Chicago, IL (US)

(72) Inventors: John Bank, Chicago, IL (US); Alex Aguayo, Skokie, IL (US); Doug Bank, Chicago, IL (US)

(73) Assignee: Phoenix Electric Mfg. Co., Chicago, IL (US)

( * ) Notice: Subject to any disclaimer, the term of this patent is extended or adjusted under 35 U.S.C. 154(b) by 0 days.

(21) Appl. No.: 14/961,093

(22) Filed: Dec. 7, 2015

Related U.S. Application Data

(60) Provisional application No. 62/164,033, filed on May 20, 2015.

(51) Int. Cl.
*H02K 13/00* (2006.01)
*H01R 39/38* (2006.01)

(52) U.S. Cl.
CPC .............. *H02K 11/40* (2016.01); *H01R 39/383* (2013.01)

(58) Field of Classification Search
CPC .... H02K 5/148; H02K 2205/06; H02K 15/14
USPC .................. 310/238–242, 245–246
See application file for complete search history.

(56) References Cited

U.S. PATENT DOCUMENTS

| | | | | |
|---|---|---|---|---|
| 4,673,837 | A * | 6/1987 | Gingerich | H02K 5/148 29/597 |
| 4,785,214 | A * | 11/1988 | Mummert | H02K 5/148 310/239 |
| 5,414,318 | A * | 5/1995 | Shimizu | H01R 39/38 310/239 |
| 5,610,467 | A * | 3/1997 | Shiah | H01R 13/58 310/220 |
| 6,555,943 | B2 * | 4/2003 | Walther | H02K 5/148 310/239 |
| 7,414,346 | B1 * | 8/2008 | Henmi | H01R 39/36 310/239 |
| 2002/0117915 | A1 * | 8/2002 | Shina | H02K 5/148 310/71 |
| 2003/0111930 | A1 * | 6/2003 | Vacheron | H01R 39/385 310/239 |

* cited by examiner

*Primary Examiner* — Thanh Lam
(74) *Attorney, Agent, or Firm* — Adam K. Sacharoff; Much Shelist

(57) ABSTRACT

The present invention relates to a brush holder assembly for use with rotating electric machines. The brush holder assembly is used as a grounding mechanism to remove dangerous and damaging static charges and extraneous electric currents from the shafts primarily of the rotating electric machines.

21 Claims, 11 Drawing Sheets

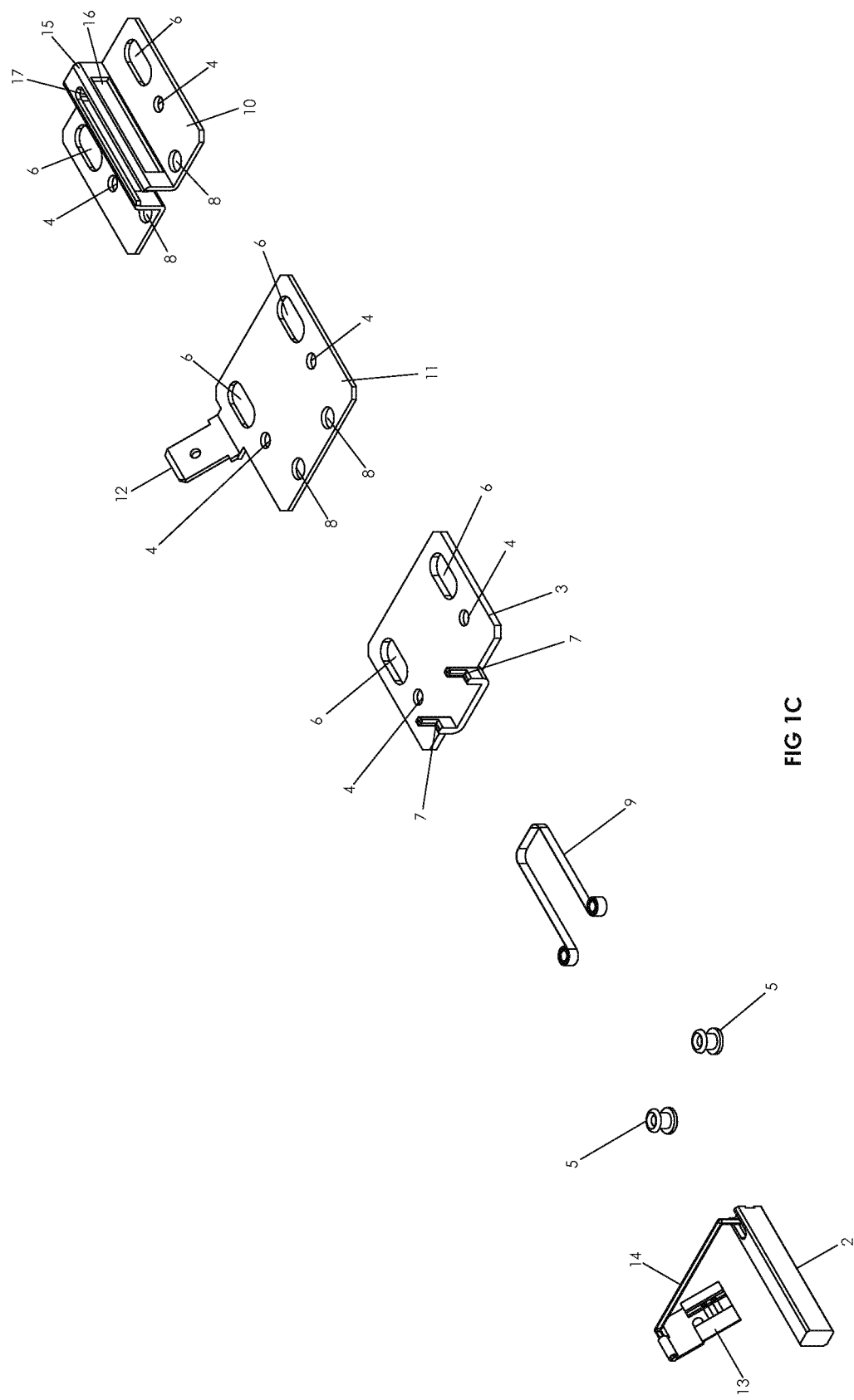

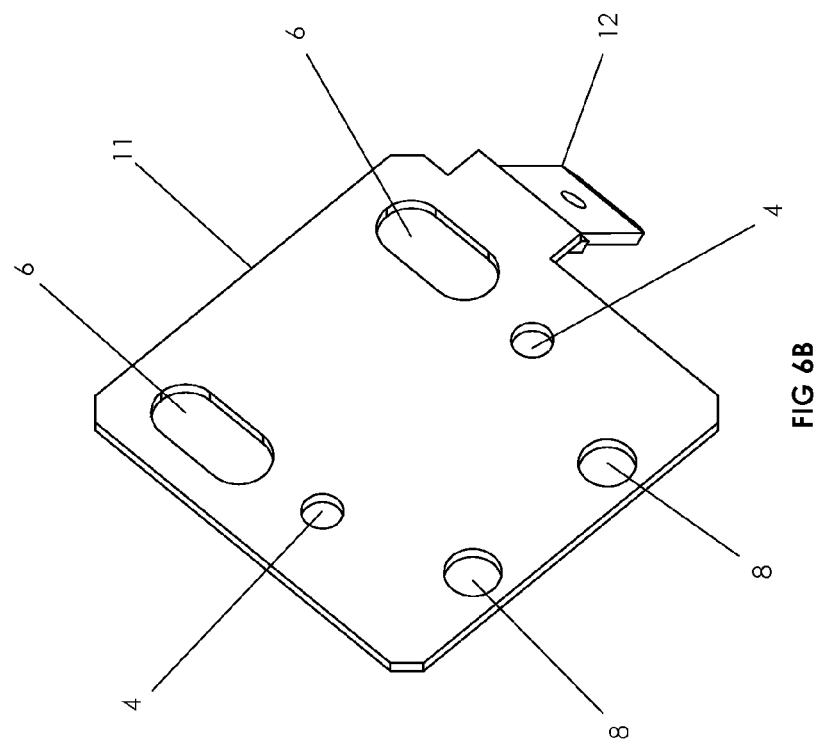
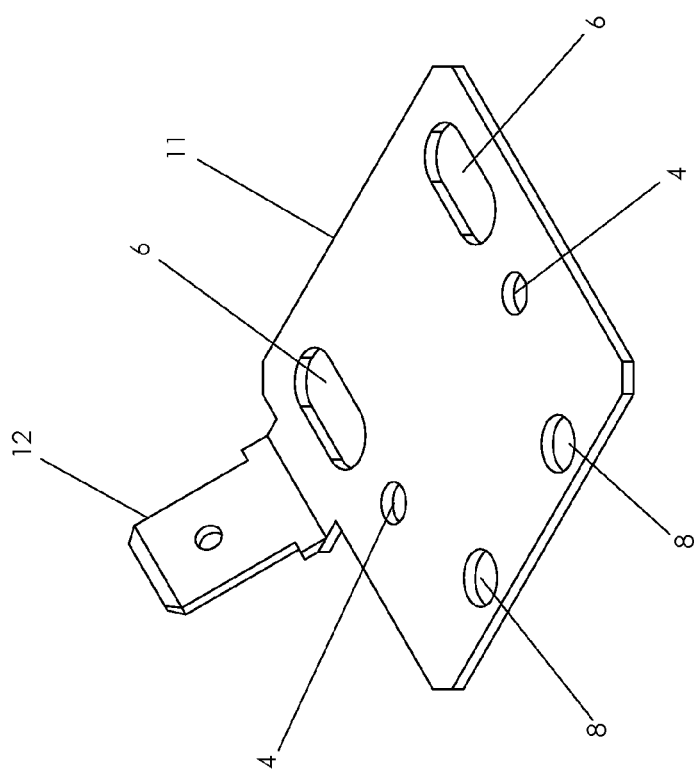

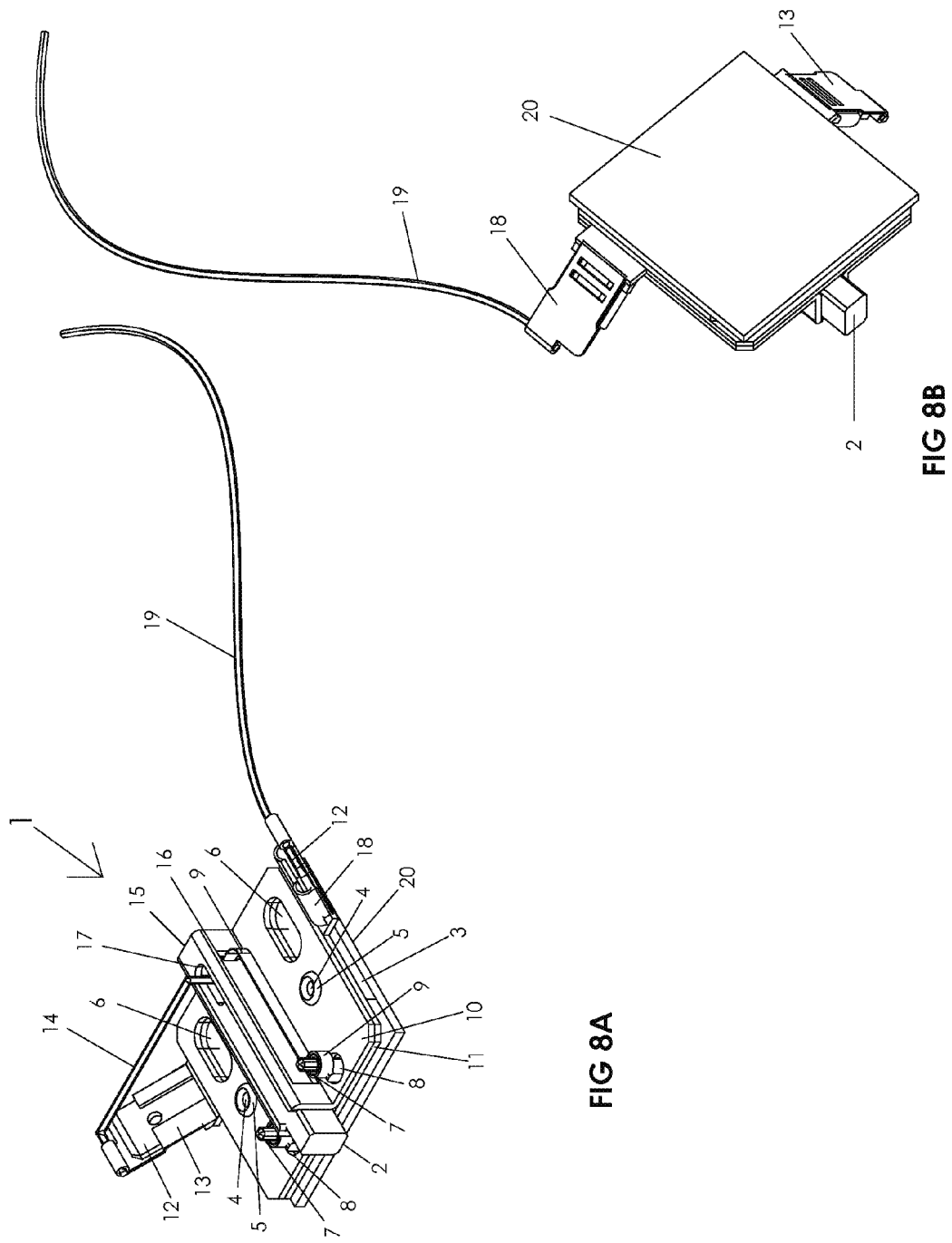

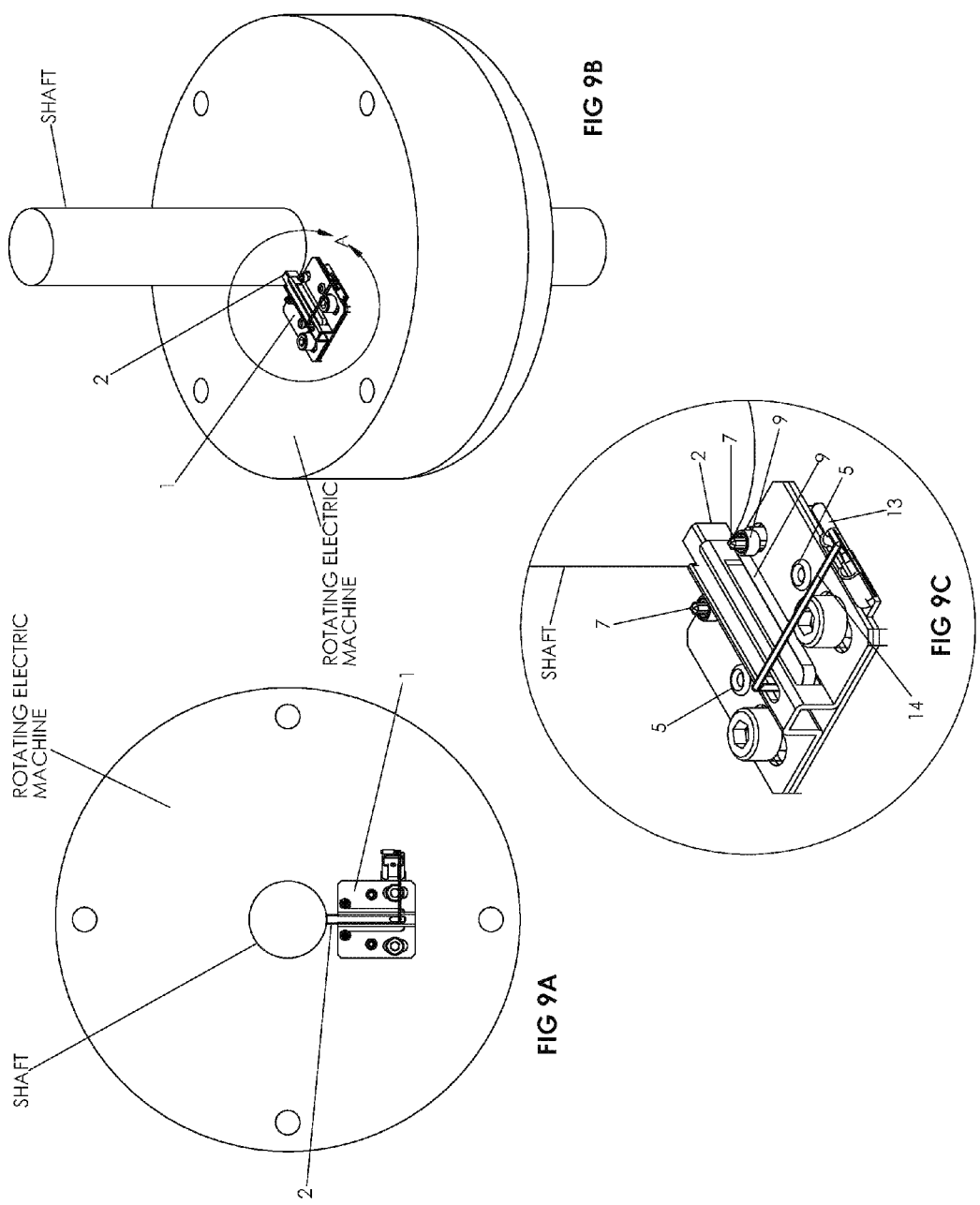

CONSTANT FORCE SHAFT GROUNDING BRUSH HOLDER

CROSS REFERENCE TO RELATED APPLICATIONS

The present invention claims priority to U.S. Provisional Application 62/164,033 filed May 20, 2015, which is incorporated in its entirety herein by reference.

FIELD OF THE INVENTION

The present invention relates to a brush holder assembly for use with rotating electric machines, whereby said brush holder assembly is used as a grounding mechanism to remove dangerous and damaging static charges and extraneous electric currents from the shafts (primarily) of said rotating electric machines.

BACKGROUND OF THE INVENTION

In many types of rotating electric machines, static charges, shaft induced currents and extraneous electric currents (collectively referred to herein as "extraneous electric currents") are generated as a dangerous by-product of the functioning of said rotating electric machine. These extraneous electric currents are especially prevalent in three-phase AC motors controlled by variable frequency speed drives typically utilizing pulse width modulation. These extraneous electric currents typically travel down the shaft of the rotating electric machine and are ultimately discharged into the bearings of the rotating electric machine, which is the path of least resistance. Over time, because of this electrical discharge into the bearings, the bearings become damaged (fluted and pitted) and lose their effectiveness. Initially, this leads to excessive noise, vibration and deficient machine performance. Eventually, it will cause premature, costly, unexpected and dangerous rotating electric machine failure. In fact, bearing failure due to damage from extraneous electric currents is one of the most prevalent causes of rotating electric machine failure. In order to prevent this from occurring, it is necessary to remove the extraneous electric currents from the shaft of the rotating electric machine before the extraneous electric currents reach and damage the bearings and ultimately harm the entire rotating electric machine. It is thus an objective of the present invention to remove these extraneous electric currents from the shafts of rotating electric machines before they damage the bearings and cause premature, unexpected, costly and damaging operational failure.

Prior to the invention of the Constant Force Shaft Grounding Brush Holder (the "CFSGBH"), a number of preventative devices have been utilized in an attempt to eliminate extraneous electric currents from the shaft of a rotating electric machine. The most frequently used has been a fixed circular ring (typically aluminum or metallic) containing carbon strands, filaments or fibers (or any other conductive medium), which protrude from its inner diameter (the "fixed circular ring"). This fixed circular ring is typically mounted on the exterior (sometimes the interior) of the rotating electric machine and surrounds the shaft in such a manner that the carbon strands, filaments or fibers make contact with the shaft as it rotates, with the putative goal of removing the extraneous electric currents from the shaft. This method has proved ineffective because the high resistivity and sub-optimal contact of the carbon strands, filaments and fibers cannot completely remove the extraneous electric currents from the shaft and thus cannot fully protect the bearings and the rotating electric machine from damage. In addition, this method is very costly to install and implement. For example, the cost of the fixed circular ring is typically unreasonably high when compared to the cost of the rotating electric machine to which it is affixed. Further, (i) because of size limitations, the fixed circular ring can generally only be mounted on the exterior of the rotating electric machine; (ii) the rotating electric machine typically has to be uncoupled from its mounting base in order to install the fixed circular ring on the surface of the rotating electric machine; and (iii) a different size fixed circular ring has to be used with each different diameter shaft thereby creating additional costs and limiting flexibility. Moreover, special coatings, tapes, finishes and powders need to be applied to the fixed circular ring and the shaft of the rotating electric machine in order to make the fixed circular ring effective, thereby adding significant costs and contaminants and decreasing the functional efficiency of the rotating electric machine.

It is generally well-know that because of their low resistivity and high conductivity, certain grades of carbon brushes (particularly silver/graphite blends) are more effective than fixed circular rings in removing extraneous electric currents from the shafts of rotating electric machines. However, until the invention of the CFSGBH, carbon brushes have not been optimally nor effectively used to remove extraneous electric currents from the shafts of rotating electric machines. A novel design breakthrough and objective of the present invention from the prior art is its ability to incorporate a true constant force spring in its design in a versatile, standardized, modular, low-profile, cost-efficient, facile manner, which overcomes the limitations of the prior art. There are examples of prior art attempting to utilize a carbon brush to remove extraneous electric currents from the shafts of rotating electric machines. These examples of prior art are generally ineffective because of their design limitations, complexity, cost and predominantly because they did not incorporate a constant force spring to resiliently urge the carbon brush towards the shaft of the rotating electric machine and thus maximize the efficacy of the carbon brush in removing extraneous electric currents from said shaft. Because of this, the carbon brushes depicted in the prior art tended to wear out quickly, did not utilize the optimal spring pressure and vibrated excessively, and thus did not function optimally, failed to effectively remove extraneous electric current from the shaft of the rotating electric machine, reduced their useful brush life and required excessive repair and replacement. The carbon brush and brush holder assembly could not accomplish their intended purpose.

SUMMARY OF THE INVENTION

The present invention solves the problem of extraneous electric currents that has perpetually plagued the rotating electric machine industry, especially as the problem pertains to three-phase AC motors controlled by variable frequency speed drives typically utilizing pulse width modulation. The CFSGBH provides manufacturers and users of rotating electric machines the ability to prolong the life of the rotating electric machine in an effective, simple, low-cost, easy-to-use manner and avoid the disastrous failures (some in mission critical applications) which have become all too common in the industry. The low-cost, versatility and ease of use and installation enhance marketplace acceptance. Ultimately, the CFSGBH is a one-stop, highly economical solution: it is a standardized, self-contained, low-cost, effective grounding system housed in a compact, modular design which can easily be used in an unlimited range of shaft diameters in a variety of interior and exterior locations on a surface of a rotating electric machine without disrupting the functioning and positioning of the rotating electric machine and providing a superior overall solution at a lower cost than the existing technology and prior art.

The CFSGBH enables the utilization of a high conductivity, low resistance silver/graphite carbon brush, which is vastly superior to the existing technology in removing extraneous electric current from the shafts of rotating electric machines. Additionally, the silver/graphite carbon brush used in tandem with the CFSGBH can remove higher voltages from the shafts of rotating electric machines than the existing technology and prior art currently allow. The CFSGBH further enables a constant force spring to be employed in conjunction with the silver/graphite carbon brush, which optimizes the wear rate, life and performance of the carbon brush.

One the unique and principal advantages of the CFSGBH is its use and economical application of a true constant force spring to resiliently urge the carbon brush towards the shaft of a rotating electric machine to remove the extraneous electric currents from said shaft. The constant force spring will permit an even, constant force of applied pressure upon the carbon brush throughout the entire range of motion of the constant force spring and the travel distance of the carbon brush, which did not exist in the prior art. The constant force spring enables the optimal spring pressure to be determined and then applied to the carbon brush throughout its travel distance. This results in a consistent minimal wear rate of the carbon brush, constant direction of applied force of the carbon brush, reduced wear of the contact surface, less carbon dust, longer brush life, and lower overall maintenance costs and machine downtime. The CFSGBH can thus be used effectively for a prolonged period of time without maintenance or replacement. In fact, the CFSGBH will typically not require maintenance, repair or replacement before the rotating electric machine to which it is affixed requires maintenance, repair or replacement. The design and style of one or more of the embodiments of the present invention enable it to accommodate a virtually unlimited variety of constant force springs of varying pressures and sizes. This in turn will allow a virtually unlimited variety of different sizes and length of carbon brush to be utilized. One or more of the embodiments of the present invention offers a highly economical degree of design and application flexibility and interchangeability in constant force springs and carbon brushes, which did not exist in the prior art. The CFSGBH will thus be able to accommodate many different sizes and pressures of constant force springs and concomitantly allow many different sizes and lengths of carbon brush to be easily used without the necessity of any redesign or retooling. This is novel from the prior art where each particular design was fixed for any particular spring pressure and size (and carbon brush length or size) and any changes could only be effectuated by costly and time-consuming redesigning, retooling and manufacturing.

The CFSGBH is a self-contained, modular, compact, low-profile, low-cost brush holder grounding mechanism employing a constant force spring, which is installed onto a rotating electric machine to remove extraneous electric current from the shaft of said rotating electric machine. The CFSGBH is designed to hold a specially formulated silver/graphite carbon brush, which, because of its low resistivity and high conductivity is superior to the existing technology and prior art and effectively and efficiently removes extraneous electric current from the shaft of a rotating electric machine, thus protecting the bearings and preventing the premature failure of said rotating electric machine. There is a female connector attached to the end of a shunt wire emanating from the posterior end or top of the carbon brush, which brush is resiliently urged towards the shaft of the rotating electric machine by a constant force spring. The female connector mates with a terminal post extending from the middle plate of the CFSGBH thus completing an integrated modular grounding system. The extraneous electric current traveling down the shaft of the rotating electric machine is effectively removed from the shaft, diverted from the bearings and redirected through the carbon brush onto the terminal post of the CFSGBH where it is harmlessly grounded and dispersed into the housing of the rotating electric machine, which is electrically conductive with the CFSGBH. The CFSGBH can be mounted on either an exterior or interior surface of the rotating electric machine without the necessity of uncoupling the rotating electric machine from its mounting base, thus saving significant time and money. The CFSGBH can be used on an infinite range of shaft diameters by merely adjusting the mounting location of the CFSGBH on the surface of the rotating electric machine, thus avoiding unnecessary and expensive design, manufacturing and tooling costs. This tremendous interchangeability and flexibility in design and performance is novel and did not exist in the prior art. In the prior art, each particular fixed circular ring, brush holder or other extraneous electric current removing device location was fixed and to change its location entailed costly and time-consuming redesign, retooling and remanufacturing. In addition, multiple CFSGBHs can easily be utilized in a variety of locations on larger electric rotating machines which have larger diameter shafts and higher voltages.

The unique and novel advantages of the CFSGBH which do not exist in the prior art and existing technology are: (i) its high level of effectiveness in removing extraneous electric currents from the shaft of a rotating electric machine; (ii) the versatility and multi-functionality of its design, which enables it to be utilized in an easy, efficient, low-cost manner on an unlimited range of sizes of rotating electric machines and shaft diameters without the necessity of uncoupling the rotating electric machines from their mounting bases, thus eliminating costly machine downtime and undue labor, costs and machine damage when disassembling; (iii) its space-saving, elegant, compact modular design enables it to be easily and quickly mounted in an unlimited array of locations on either an interior or exterior surface of a rotating electric machine, allowing for optimal ease of installation and use; (iv) its low-cost increases marketplace acceptance and utilization; (v) the simplicity, versatility and standardization of its design allow for manufacturing and purchasing economies of scale augmenting the assimilation of its use in the stream of commerce; (vi) its standardization, low profile and compact modular design allow it to be used with a shaft of any diameter, which significantly reduces or completely eliminates tooling costs; (vii) its compact modular design and low profile save substantial space on the rotating electric machine, further reducing material costs; (viii) its effective incorporation and utilization of a constant force spring allows for optimal and prolonged long-life carbon brush performance without the necessity of maintenance or replacement; (ix) its effective incorporation and utilization of a constant force spring reduces repair and maintenance costs and machine downtime and optimizes carbon brush life; (x) it typically will not require maintenance, repair or replacement before the rotating electric machine to which it is affixed otherwise requires maintenance, repair or replacement; (xi) its effective incorporation and utilization of a constant force spring allows the optimal spring pressure to be calculated for any particular carbon brush size and application and then utilized on a consistent basis throughout the entire travel distance of the carbon brush; (xii) its design will accommodate many different sizes and pressures of constant force springs thus allowing many different sizes and lengths of carbon brush to be easily used without the necessity of any redesign or retooling; (xiii) its use of a specially formulated silver/graphite carbon brush, which provides low resistance and high conductivity, thereby enabling an optimal grounding system which effectively removes extraneous electric currents from the shafts of rotating electric machines without the necessity of adding costly and contaminating coatings, finishes and powders; (xiv) the tight tolerances held by the brush channel housing contain the carbon brush more securely, thus minimizing lateral brush movement and vibration; and (xv) the integrally manufactured, free standing terminal post allows for easy connection to a mating female connector attached to the shunt wire of the carbon brush, thus creating a compact, modular, self-contained grounding system which is easy and economical to install, use and maintain.

Numerous other advantage and factors of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein:

FIGS. 1A, 1B and 1C are a top view, bottom view and exploded view, respectively, of an embodiment of the present invention;

FIGS. 6A and 6B are a top view and bottom view, respectively, of a middle plate embodiment of an embodiment of the present invention;

FIGS. 8A, 8B and 8C, are a top view, bottom view and exploded view, respectively, of an additional embodiment of the present invention; and FIGS. 9A, 9B and 9C are a top view, isometric view and magnified view, respectively, of an embodiment of the present invention affixed to a rotating electric machine.

DESCRIPTION OF THE EMBODIMENTS

Figure 1A:
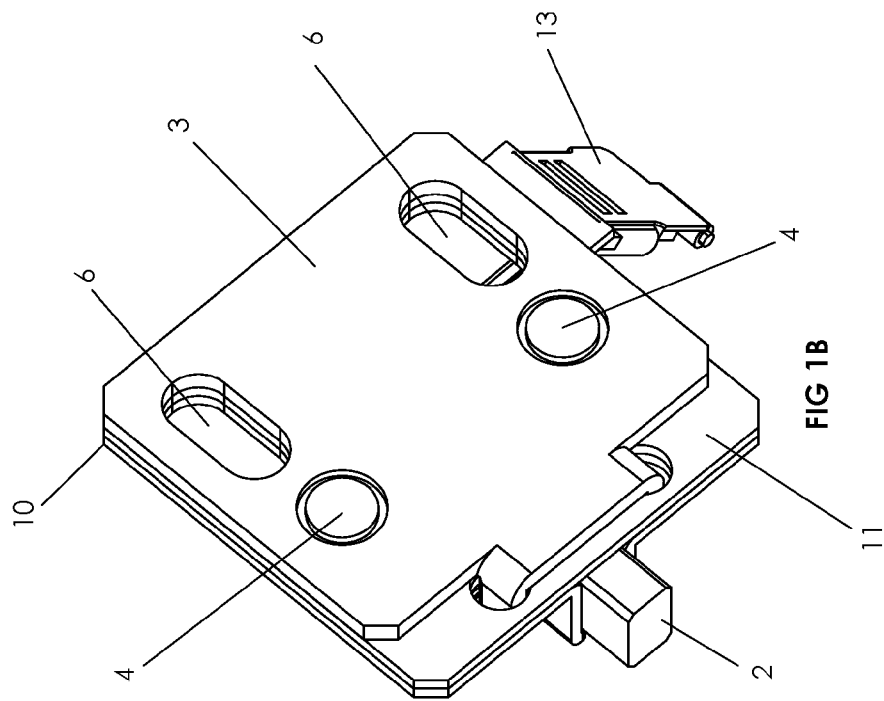
Figure 1B:
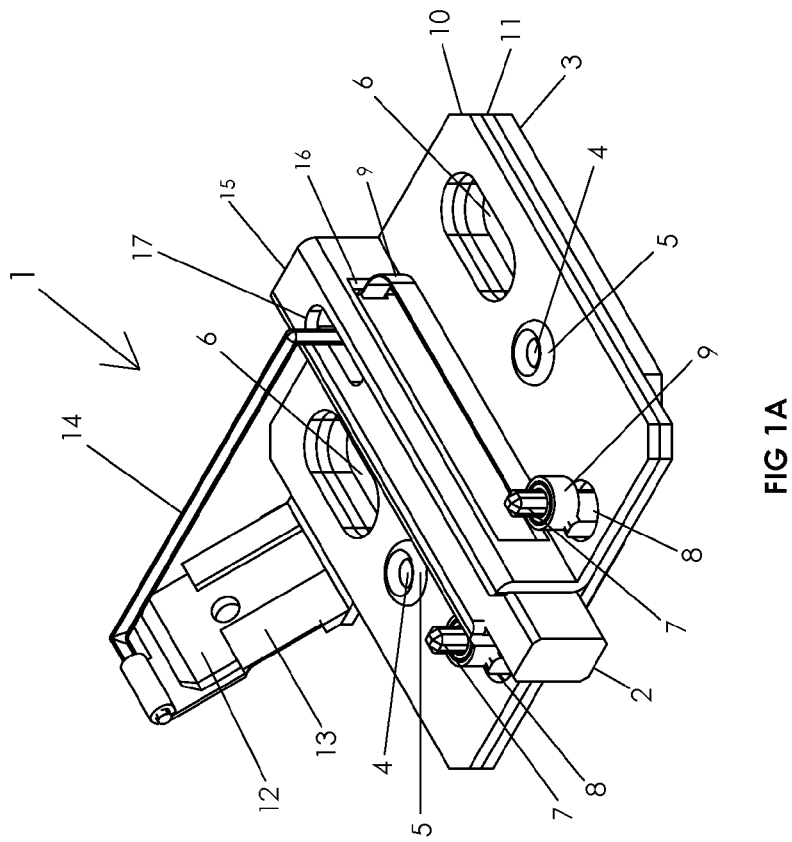
Figure 2B:
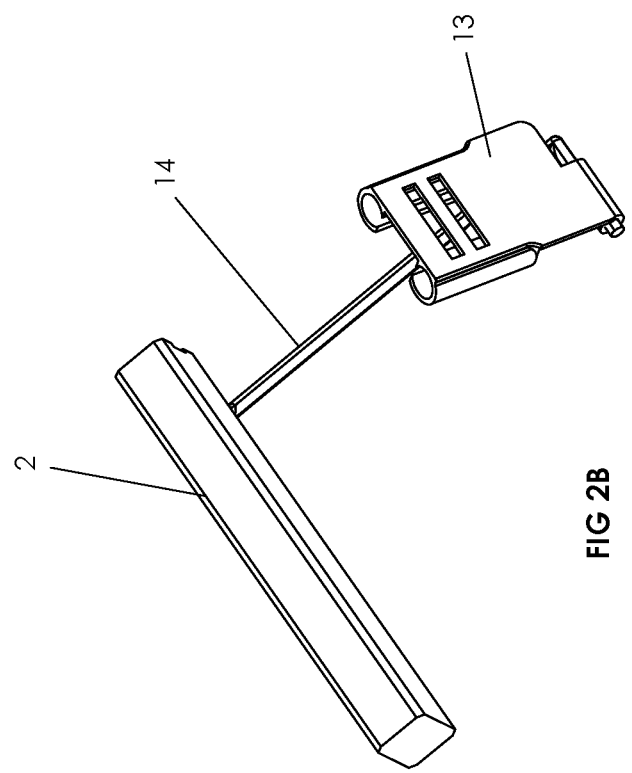
FIGS. 2A and 2B are a top view and bottom view, respectively, of a carbon brush and shunt wire assembly embodiment of an embodiment of the present invention.
Figure 2A:
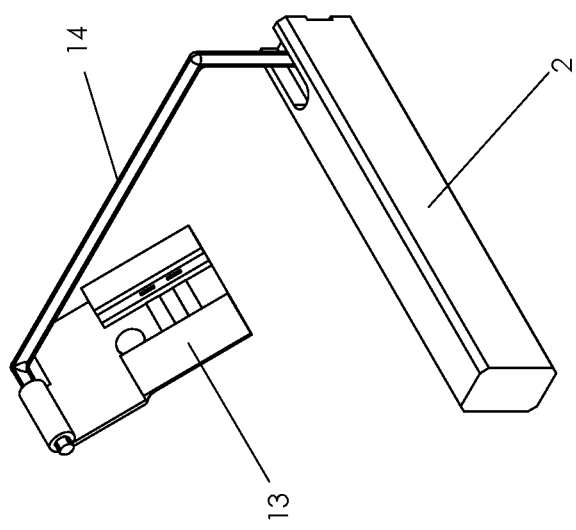
Figure 3B:
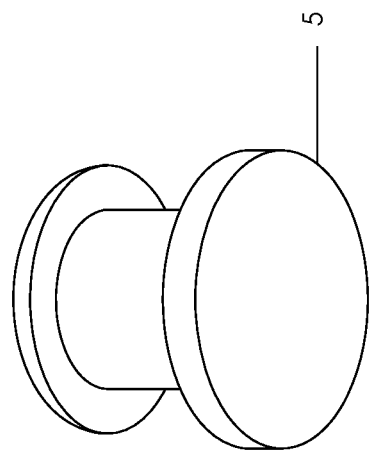
FIGS. 3A and 3B are a top view and bottom view, respectively, of a fastener embodiment of an embodiment of the present invention.
Figure 3A:
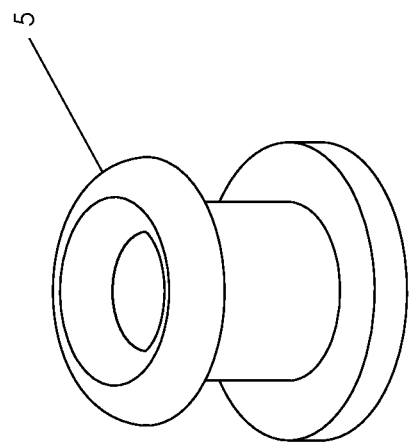
Figure 4B:
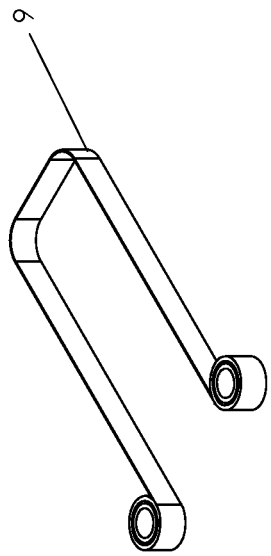
FIGS. 4A and 4B are a top view and bottom view, respectively, of a constant force spring embodiment of an embodiment of the present invention.
Figure 4A:
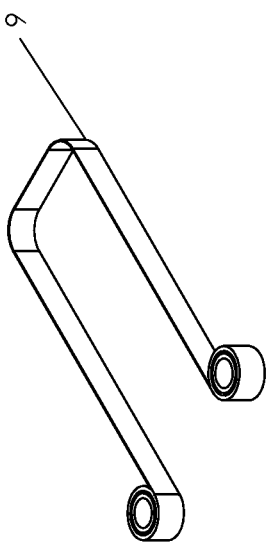
Figure 5B:
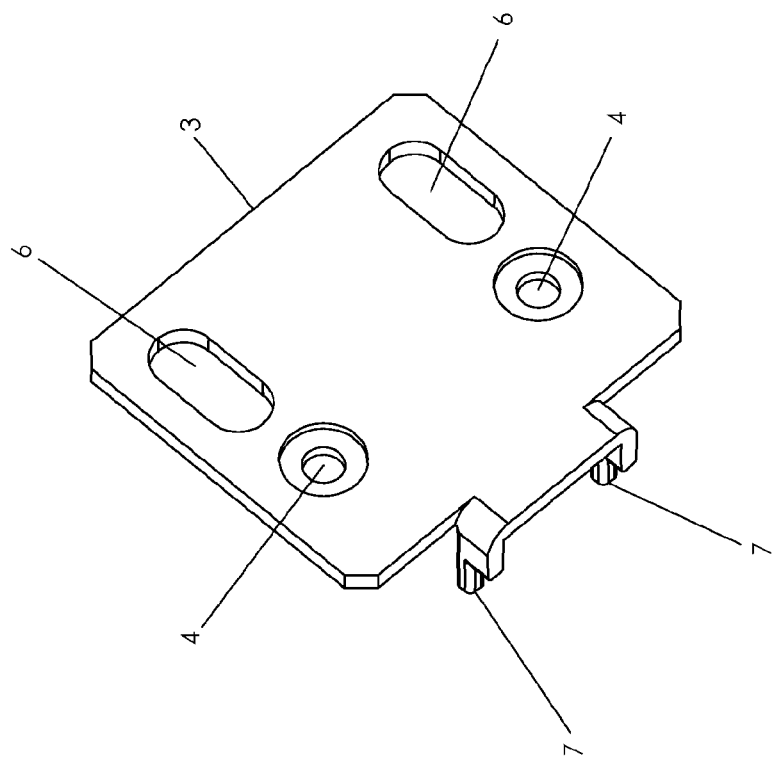
FIGS. 5A and 5B are a top view and bottom view, respectively, of a bottom plate embodiment of an embodiment of the present invention.
Figure 5A:
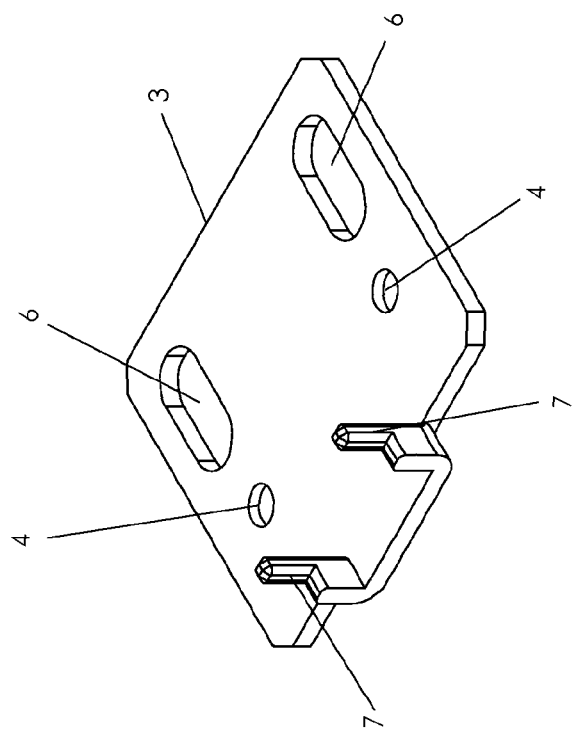
Figure 7B:
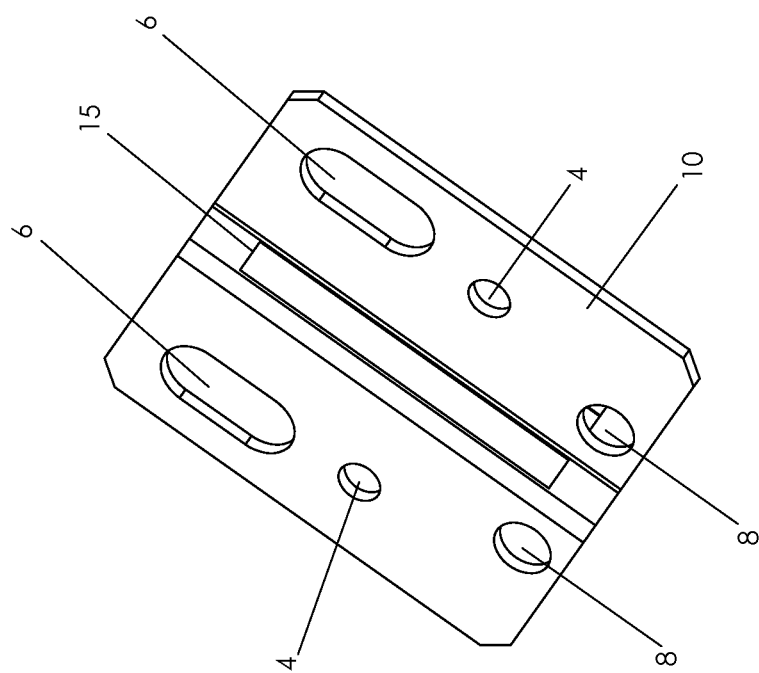
FIGS. 7A and 7B are a top view and bottom view, respectively, of a top plate embodiment of an embodiment of the present invention.
Figure 7A:
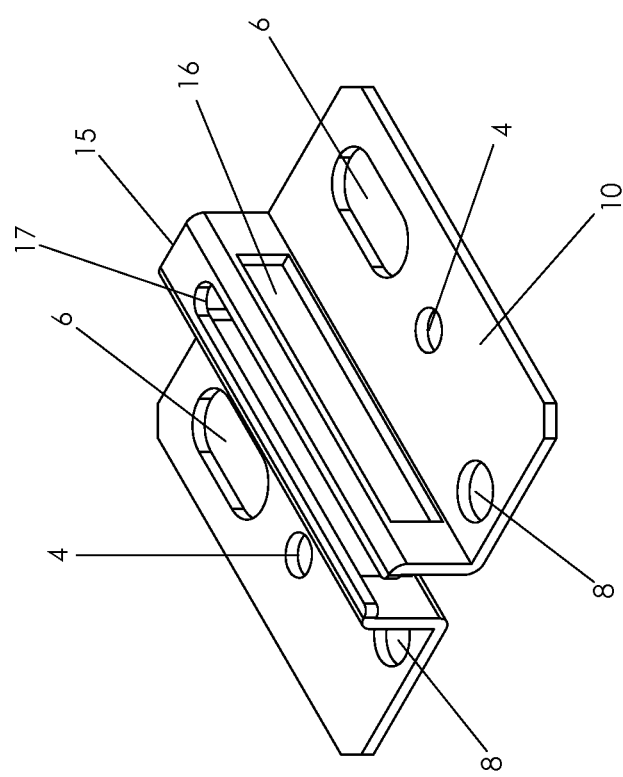

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims by the embodiments illustrated.

As depicted in FIG. 1A through FIG. 7B, the CFSGBH 1 is used to house a carbon brush 2, which carbon brush 2 is used to remove extraneous electric currents from the shaft or other surface of a rotating electric machine. The CFSGBH 1 usually consists of three (3) separate electrically conductive (typically metallic) plates 3, 11, 10 which are fastened (or otherwise assembled) together. The CFSGBH 1 is designed specifically to incorporate a constant force spring 9. The bottom plate 3 contains two symmetrical circular openings 4 to receive the fasteners (typically rivets) 5 which are used to fasten or assemble the three plates 3, 11, 10, together as well as two symmetrical oblong oval openings 6 which are used to receive mounting screws used to attach the CFSGBH 1 to a surface on a rotating electric machine, which symmetrical oblong oval openings 6 are designed specifically to allow for a range of mounting distances from the shaft or other surface of a rotating electric machine, from which the extraneous electric currents are removed. The bottom plate 3 is fabricated in a manner such that two symmetrical vertical stanchions 7 are created from the manufacturing process which are perpendicular to the plane of the bottom plate 3 and which protrude through each of two openings 8 in the middle plate 11 and top plate 10. When the three plates 3, 11, 10 are fastened or assembled together, a constant force spring 9 is mounted on the portion of the two symmetrical vertical stanchions 7 which protrude perpendicularly above the plane of the top plate 10. The two symmetrical vertical stanchions 7 hold the constant force spring 9 in its proper and optimum actuating position. The middle plate 11 contains two symmetrical circular openings 4 to receive the fasteners 5 which are used to fasten or assemble the three plates 3, 11, 10 together, as well as two symmetrical oblong oval openings 6 which are used to receive mounting screws used to attach the CFSGBH 1 to a surface on a rotating electric machine from which the extraneous electric currents are removed. The middle plate 11 also contains two symmetrical circular openings 8 which are used to allow the two symmetrical vertical stanchions 7 contained in the bottom plate 3 to pass through. In addition, the middle plate 11 may contain one (or more) terminal posts 12 which extend upwardly and outwardly from the plane of the middle plate 11 either angularly or perpendicularly, which are used to receive a mating female terminal 13 which is attached to the end of a shunt wire 14 emanating from the posterior end or top of a carbon brush 2 which is housed in the brush channel 15 fabricated as part of the top plate 10. The top plate 10 contains: (i) two symmetrical circular openings 4 to receive fasteners 5 which are used to fasten or assemble the three plates 3, 11, 10 together; (ii) two symmetrical oblong oval openings 6 which are used to receive mounting screws used to attach the CFSGBH 1 to a surface of a rotating electric machine from which the extraneous electric currents are removed; (iii) two symmetrical circular openings 8 which are used to allow the two symmetrical vertical stanchions 7 contained in the bottom plate 3 to pass through; (iv) a rectangular (or square) open-ended brush channel 15 containing two symmetrical slots 16 on each lateral side which are perpendicular to the plane of the top plate 10, which open-ended brush channel 15 houses a carbon brush 2; and (v) a slot 17 running along the top of the brush channel 15 parallel to the plane of the top plate 10 through which the shunt wire 14 may pass through. The symmetrical slots 16 in the open-ended brush channel 15 allow for the full engagement and free movement of the constant force spring 9. The symmetrical oblong oval openings 6 contained in each of the top 10, middle 11 and bottom plates 3 are designed in such a manner that the mounting screws used to affix the CFSGBH 1 to a surface of the rotating electric machine can be positioned in a variety of locations within such symmetrical oblong oval openings 6 so as allow the optimal positioning of the CFS- GBH 1 on the rotating electric machine in relation to the rotating conductive surface (typically a shaft) from which the CFSGBH 1 is removing extraneous electric current. The constant force spring 9 is affixed to the portion of the two symmetrical vertical stanchions 7 of the bottom plate 3 which protrude perpendicularly above the plane of the top plate 10. The function of the constant force spring 9 is to uniformly apply constant pressure to the carbon brush 2 housed in the rectangular (or square) brush channel 15 fabricated as part of the top plate 10. The carbon brush 2 is positioned against a rotating conductive surface (typically the shaft) of an electric motor or generator and is resiliently urged toward said rotating conductive surface by the constant force spring 9. A shunt wire 14 emanates from the posterior end or top of the carbon brush 2. At the end of the shunt wire 14, a female terminal 13 is attached. The female terminal 13 mates with the terminal post 12 extending either angularly or perpendicularly beyond the plane of the middle plate 11, thus creating a self-contained modular grounding system. The extraneous electric currents traveling down the shaft of the rotating electric machine are removed from the shaft by the carbon brush 2 and redirected through the shunt wire 14 emanating from the posterior end or top of the carbon brush 2 onto the terminal post 12 of the CFSGBH 1 where they are diverted from the bearings and harmlessly grounded and dispersed. FIGS. 9A, 9B and 9C depict an embodiment of the CFSGBH 1 affixed to the exterior of a rotating electric machine. The CFSGBH 1 may also be affixed to the interior of a rotating electric machine. The CFSGBH 1 may also be electroplated with a conductive protective surface. Those skilled in the art can easily ascertain that the CFSGBH 1 can be utilized in a myriad of different sizes and applications, including, without limitation, slip ring assemblies and bearing isolation devices.

Figure 8C:
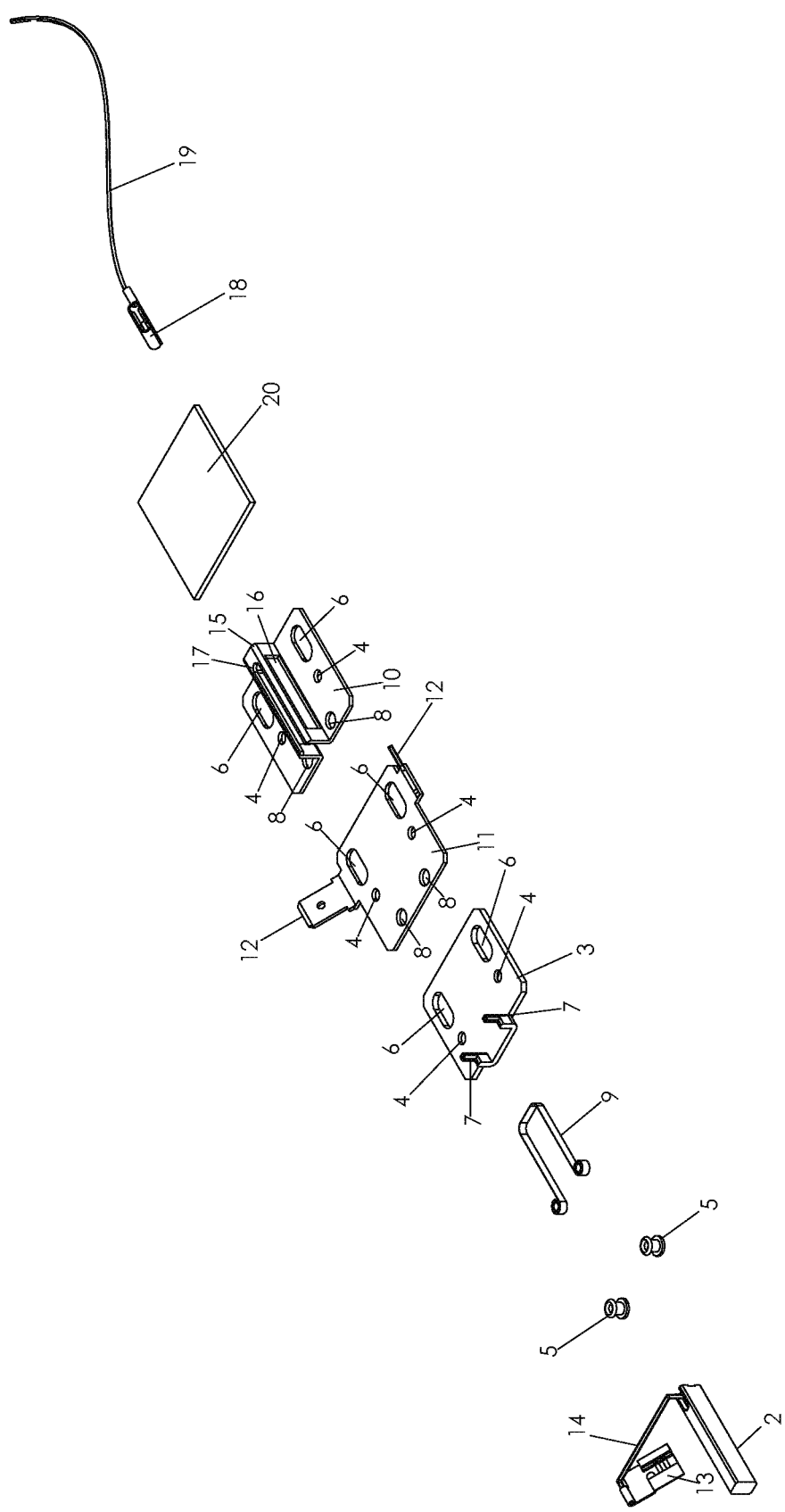

In another embodiment of the present invention, as depicted in FIGS. 8A, 8B and 8C, an adhesive fastener 20 may be attached to the underside of the bottom plate 3, which adhesive fastener 20 can be used to secure the CFSGBH 1 to the surface of the electric rotating machine. In the event that the adhesive fastener 20 is non-conductive, the middle plate 11 may contain an additional terminal post 12 which extends upwardly and outwardly from the plane of the middle plate 11 either angularly or perpendicularly, which terminal post 12 is used to receive a mating female terminal 18 attached to a grounding wire 19. In this instance, after the CFSGBH 1 is secured to the surface of the rotating electric machine, the grounding wire 19 is then fastened to a conductive surface on the rotating electric machine or elsewhere, so that the extraneous electric currents traveling down the shaft of the rotating electric machine are removed from the shaft by the carbon brush 2 and redirected through the shunt wire 14 onto the CFSGBH 1 and through the grounding wire 19 where they are diverted from the bearings and harmlessly grounded and dispersed.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is intended to cover by the appended claims all such modifications as fall within the scope of the claims.

We claim:

1. A constant force shaft grounding brush holder configured for placement adjacent to a rotating conductive surface in an electric motor or machine, the brush holder comprising:

a brush holder base, wherein the base includes three separate electrically conductive plates defined as a bottom plate, a middle plate, and a top plate;

a pair of stanchions extending from the bottom plate through the middle and top plates;

a terminal post extending upwardly and outwardly from brush holder base;

a brush channel housing extending from the top plate, the brush channel housing having an open end, a pair of symmetrical lateral slots running on each lateral side of the brush channel housing and further having an upper slot running along a top portion of the brush channel housing;

a carbon brush housed in the brush channel housing;

a shunt wire having a first end secured through the upper slot in the brush channel housing to the carbon brush and further having a second end secured to a female terminal;

the female terminal configured to attach to the terminal post;

a constant force spring having a pair of coil ends separately secured about the pair of stanchions and further having a spring body extending between the two coil ends, the spring body being positioned through the lateral slots and against the rear end of the carbon brush such that the constant force spring exerts a constant uniform force against the rear end of the brush such that the front end of the brush maintains a constant pressure against the rotating conductive surface, and wherein extraneous electric currents traveling through the rotating conductive surface are removed therefrom by the carbon brush and redirected through the shunt wire emanating from the carbon brush onto the terminal post and harmlessly grounded and dispersed.

2. The constant force shaft grounding brush holder of claim 1, wherein the three separate electrically conductive plates each having a pair of openings which align to receive fasteners to assemble the three separate electrically conductive plates together.

3. The constant force shaft grounding brush holder of claim 1, wherein the three separate electrically conductive plates each have two symmetrical openings which align to receive mounting screws used to attach the brush holder base to a surface on a rotating electric machine, and wherein the openings are configured to adjust the mounting on the surface of the rotating electric machine.

4. The constant force shaft grounding brush holder of claim 1 further comprising an adhesive backing secured to an underside portion of the brush holder base to attach the brush holder base to a surface on a rotating electric machine.

5. The constant force shaft grounding brush holder of claim 4 further comprising a second terminal post extending from the middle plate, second terminal post configured to receive a second female terminal that is secured to a grounding wire.

6. The constant force shaft grounding brush holder of claim 1, wherein the two stanchions are further configured as being vertically extending perpendicularly to a plane defined in the bottom plate.

7. The constant force shaft grounding brush holder of claim 1, wherein the middle and top plates each contain a pair of openings which align when assembled to receive fasteners, the fasteners are configured to fasten into the bottom plate such that the three plates are secured together.

8. The constant force shaft grounding brush holder of claim 1, wherein the terminal post extends upwardly and outwardly from an edge of the middle plate.

9. The constant force shaft grounding brush holder of claim 1, wherein the shunt wire is secured to the rear end or top of the carbon brush.

10. A constant force shaft grounding brush holder configured for placement adjacent to a rotating conductive surface in an electric motor or machine to remove extraneous electric currents, the brush holder comprising:
   a brush holder base, wherein the base includes three separate electrically conductive plates defined as a bottom plate, a middle plate, and a top plate and wherein the three separate electrically conductive plates each having a pair of openings configured to align and receive fasteners to assemble the three separate electrically conductive plates together;
   a pair of stanchions extending from the bottom plate through the middle and top plates;
   a terminal post extending upwardly and outwardly from the middle plate;
   a brush channel housing extending from the top plate, the brush channel housing having an open end, a pair of symmetrical lateral slots running on each lateral side of the brush channel housing and further having an upper slot running along a top portion of the brush channel housing;
   a carbon brush housed in the brush channel housing;
   a shunt wire having a first end secured to the carbon brush and extending through the upper slot in the brush channel housing such that a second end of the shunt wire is secured to a female terminal, and wherein the female terminal is configured to attach to the terminal post; and
   a constant force spring having a pair of coil ends separately secured about the pair of stanchions and further having a spring body extending between the two coil ends, the spring body being positioned through the lateral slots and against the rear end of the carbon brush such that the constant force spring exerts a constant uniform force against the rear end of the brush such that the front end of the brush maintains a constant pressure against the rotating conductive surface, and wherein extraneous electric currents traveling through the rotating conductive surface are removed therefrom by the carbon brush and redirected through the shunt wire emanating from the carbon brush onto the terminal post and harmlessly grounded and dispersed.

11. The constant force shaft grounding brush holder of claim 10, wherein the three separate electrically conductive plates each have two symmetrical openings which align to receive mounting screws used to attach the base to a surface on a rotating electric machine, and wherein the openings are configured to adjust the mounting on the surface of the rotating electric machine.

12. The constant force shaft grounding brush holder of claim 10 further comprising:
   an adhesive backing secured to an underside portion of the brush holder base to attach the brush holder base to a surface on a rotating electric machine; and
   a second terminal post extending from the middle plate, the second terminal post configured to receive a second female terminal that is secured to a grounding wire.

13. The constant force shaft grounding brush holder of claim 10, wherein the two stanchions are further configured as being vertically extending perpendicularly to a plane defined in the bottom plate.

14. The constant force shaft grounding brush holder of claim 10, wherein the bottom, middle, and top plates each contain a pair of mounting openings which align when assembled to receive mounting screws, the mounting screws are configured to attach the constant force shaft grounding brush holder to a surface on a rotating electric machine.

15. The constant force shaft grounding brush holder of claim 14, wherein the mounting openings are such that the mounting of the plates to the surface on the rotating electric machine is adjustable.

16. The constant force shaft grounding brush holder of claim 10, wherein the terminal post extends upwardly and outwardly from an edge of the middle plate.

17. The constant force shaft grounding brush holder of claim 10, wherein the shunt wire is secured to the rear end or top of the carbon brush.

18. A constant force shaft grounding brush holder configured for placement adjacent to a rotating conductive surface in an electric motor or machine to remove extraneous electric currents, the brush holder comprising:
   a brush holder base having an upper surface, the brush holder base having a pair of stanchions extending upwardly from the upper surface and further having a terminal extending upwardly and outwardly therefrom;
   a brush channel housing positioned on the upper surface, the brush channel housing having an open end, a pair of symmetrical lateral slots running on each lateral side of the brush channel housing and further having an upper slot running along a top portion of the brush channel housing;
   a carbon brush housed in the brush channel housing;
   a shunt wire having a first end secured to the carbon brush and extending through the upper slot in the brush channel housing such that a second end of the shunt wire is secured to the terminal; and
   a constant force spring having a pair of coil ends separately secured about the pair of stanchions and further having a spring body extending between the two coil ends, the spring body being positioned through the lateral slots and against the rear end of the carbon brush such that the constant force spring exerts a constant uniform force against the rear end of the brush such that the front end of the brush maintains a constant pressure against the rotating conductive surface, and wherein extraneous electric currents traveling through the rotating conductive surface are removed therefrom by the carbon brush and redirected through the shunt wire emanating from the carbon brush onto the terminal post and harmlessly grounded and dispersed.

19. The constant force shaft grounding brush holder of claim 18 further comprising:
   an adhesive backing secured to an underside portion of the brush holder base to attach the brush holder base to a surface on a rotating electric machine; and
   a second terminal connection extending from the brush holder base, and wherein the second terminal connection is secured to a grounding wire.

20. The constant force shaft grounding brush holder of claim 18, wherein the base includes three separate electrically conductive plates defined as a bottom plate, a middle plate, and a top plate and wherein the three separate electrically conductive plates each having a pair of openings configured to align and receive fasteners to assemble the three separate electrically conductive plates together.

21. The constant force shaft grounding brush holder of claim 20, wherein the terminal connection is further defined as having a terminal post extending upwardly and outwardly from the middle plate and a female terminal is configured to attach to the terminal post and wherein the shunt wire is secured to the female terminal and wherein the pair of stanchions extend from the bottom plate through openings in the middle and upper plates.

* * * * *